Oct. 23, 1956          F. L. DAVIS          2,767,638

AIR CONDITIONER FOR VEHICLES

Filed June 17, 1953          2 Sheets-Sheet 1

Floyd L. Davis
INVENTOR.

BY Philip A. B. Turell
his Atty.

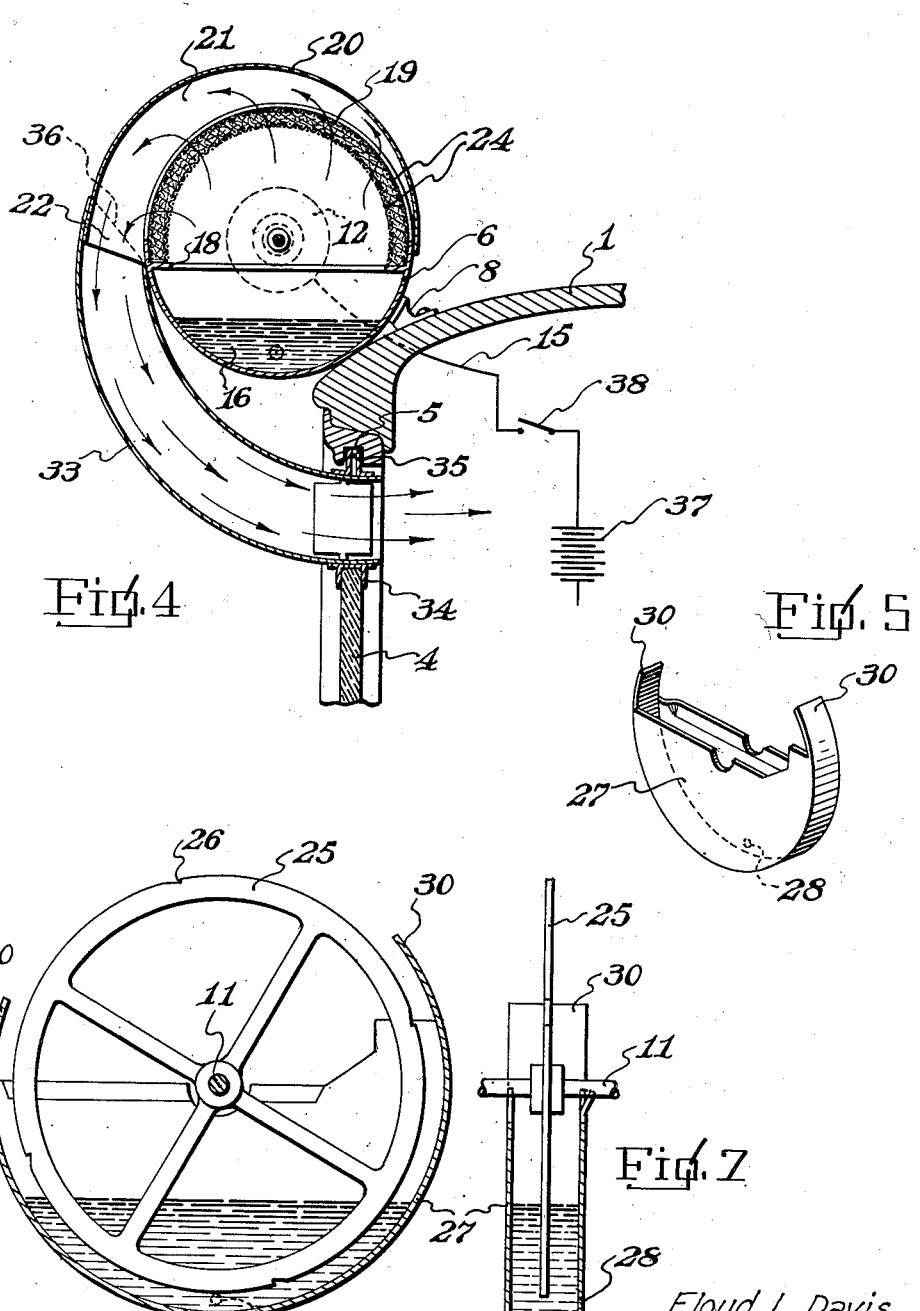

United States Patent Office 2,767,638
Patented Oct. 23, 1956

2,767,638

AIR CONDITIONER FOR VEHICLES

Floyd L. Davis, Tulsa, Okla.

Application June 17, 1953, Serial No. 362,257

4 Claims. (Cl. 98—2)

The invention relates to air conditioners for automobiles, and has for its object to provide a device of this kind, wherein the conditioner is located outside the vehicle and the conditioned air is discharged into the vehicle.

A further object is to discharge the conditioned air from the conditioner, through a duct, and through the window opening into the interior of the vehicle. Also to mount the duct part of the conditioner in a window opening and preferably in the window opening of the vehicle door.

A further object is to mount the body of the air conditioner on the top of the vehicle, above the door opening with a portion of the duct carried by the conditioner, and another portion mounted in the window opening of the door, in a position where, when the door is opened the duct sections will separate, and when the door is closed a continuous single duct is formed for conducting conditioned air into the vehicle.

A further object is to provide means whereby the conditioner can be optionally operated by fan means when the vehicle is in motion or by the passage of air through the conditioner when the vehicle is in motion, or by the motor driven fan when the vehicle is standing still, as for instance in outdoor movie parks.

A further object is to provide a conditioner in cylindrical form, and elongated and also to provide in connection therewith an air duct curving outwardly, downwardly and inwardly and discharging through a window opening of the vehicle.

A further object is to provide an outside cylindrically shaped air conditioner, carried by the top of a vehicle and to discharge conditioned air therefrom outwardly, downwardly and inwardly into the vehicle.

A further object is to provide a cylindrically shaped outside air conditioner for a vehicle, wherein the conditioner is horizontally disposed, and having therein a fan at the forward open end thereof, a drive shaft extending from the fan to the rear end of the conditioner and terminating in a drive motor. Also a reservoir in the lower portion of the conditioner, a filter arcuately shaped at the upper side of the conditioner and a water distributing wheel carried by the shaft, below the filter and adapted to pickup and distribute water through the air passing through the device and onto the filter for moistening the air as forced through the filter.

With the above and other objects in view, the invention resides in the combination and arrangement of parts, hereinafter set forth, described and claimed, it being understood that changes in the precise embodiment of the invention may be made within the scope of the claims, without departing from the spirit of the invention.

In the drawings:

Figure 4 is a vertical transverse sectional view taken on line 4—4 of Figure 2, showing a part of the vehicle in section.

Figure 5 is a perspective view of the water wheel guard.

Figure 6 is a side elevation of the water wheel and a transverse section through the wheel guard.

Figure 7 is a transverse sectional view through the water wheel guard, showing the water wheel in end elevation.

Figure 1:
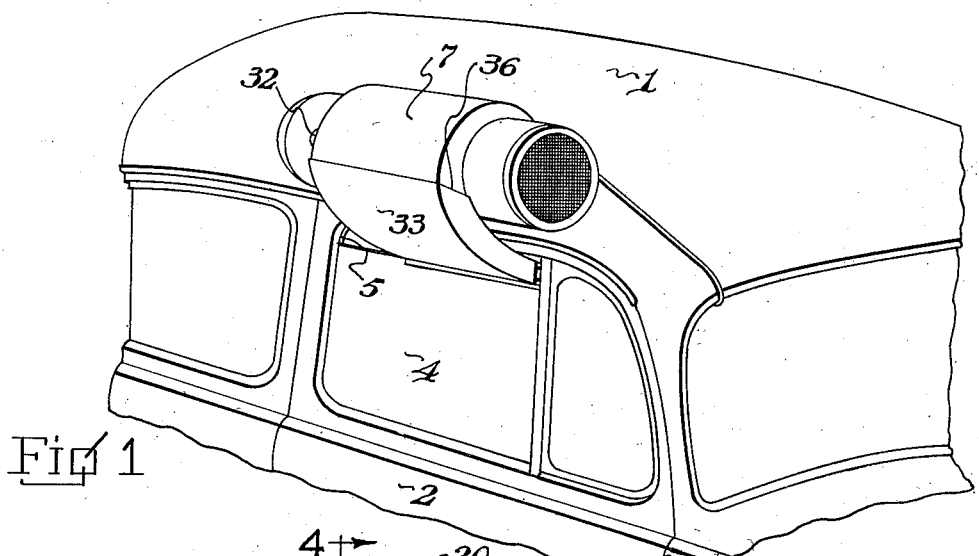
Figure 1 is a perspective view of the air conditioner, showing the same applied to a conventional automobile body.
Figure 2:
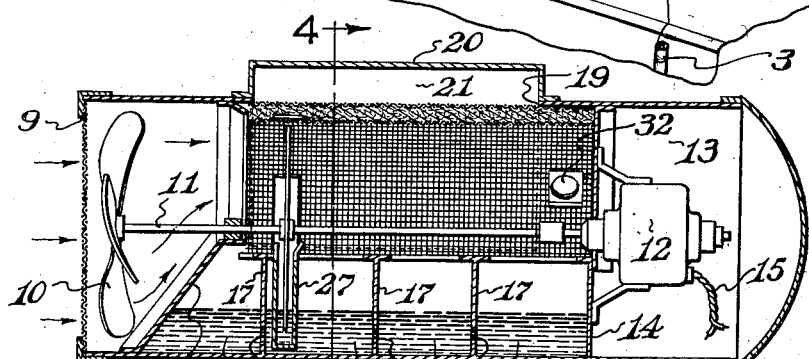
Figure 2 is a vertical longitudinal sectional view through the air conditioner.
Figure 3:
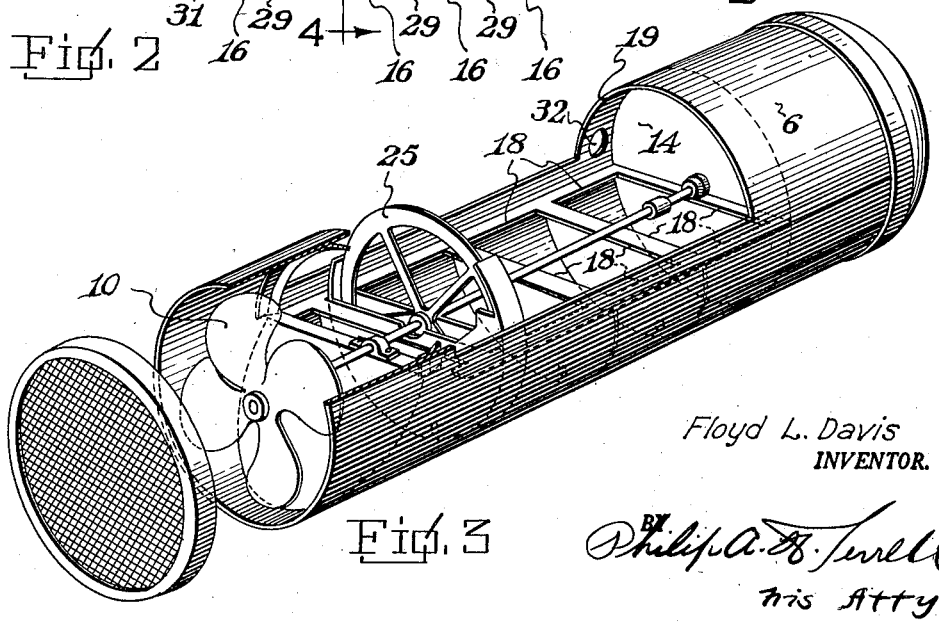
Figure 3 is a perspective view of the air conditioner, part being broken away to better show the structure.

Referring to the drawings, the numeral 1 designates the top of a conventional form of automobile and 2 the door thereof, which door is hingedly mounted at 3 to swing in a horizontal plane. The door 2 is provided with a glass window 4 which moves upwardly and downwardly in the usual way, however, for illustrative purposes the window moves in the frame grooves 5 in the usual manner.

Mounted on the vehicle top 1 to one side thereof is the cylindrical casing 6, of the air conditioner 7, the mounting is by means of brackets 8. It will be noted that the air conditioner is positioned not only outside the vehicle, but above the vehicle door as it is designed to discharge conditioned air through the window opening of the door above the glass window 4 as clearly shown in Figures 1 and 4.

The air conditioner comprises an elongated casing 6, and the casing is preferably cylindrical shaped with its axis horizontally disposed as clearly shown in Figure 1 of the drawings. Casing 6 has its forward end 9 open so that air will enter the same either incident to the forward movement of the vehicle, or incident to the operation of the fan 10 by a motor when the vehicle is standing still, as for instance when the vehicle is in an outdoor movie. Fan 10 is mounted on the forward end of a drive shaft 11, and the shaft extends axially through the conditioner casing and is driven by an electric motor 12 located in a motor compartment 13 in the rear end of the casing. The motor compartment is formed by a transverse partition 14, and the motor is preferably supported on said partition. Wires 15 connected to the motor lead to any suitable source of power and the circuit is preferably controlled from within the vehicle. The forward open end of the casing is provided with a removable screen to prevent insects and foreign matter from entering the conditioner and clogging same.

Disposed in the lower side of the casing is a plurality of reservoirs 16 for the reception of water. The reservoirs are spaced from each other by partitions 17 the upper ends of which terminate below the fan shaft. The partitions along with the marginal flanges 18, extending around the upper ends of the reservoirs 16, prevent splashing of the water upon sudden stops of the vehicle and deflect any agitated water inwardly and downwardly and back into the reservoirs. The upper side of the conditioner casing is provided with an air discharge opening 19, extending transversely substantially half way around the upper side of the casing and through which opening, conditioned air is discharged into an arcuate casing 20 arching the upper side of the casing and the air discharge opening 19. Arcuate casing 20 has therein, an arcuate air passage 21 which increases in size towards its discharge end 22 so that the conditioned air, forced through the conditioner, can expand in transverse area as it approaches a point where it will enter the vehicle, see Figure 4. The enlarged end of the casing 20 terminates to the outside of the conditioner casing and at a point above the vehicle door, the purpose of which will presently appear.

The discharge opening 19 of the casing is closed by an arcuately shaped air filter formed of any suitable material and this material is disposed between spaced screen walls 24 for maintaining the filtering material compact. The filter is maintained moistened by water from the reservoirs 16, by a splashing and spraying wheel 25, mounted on the forward portion of the drive shaft 11 and rotatable with said shaft. The periphery of the wheel 25 is provided with water pickup notches 26. Wheel 25 is positioned where its lower portion rotates in a water collecting trough 27 and into which trough water enters through port 28, hence it will be seen that the water wheel operates in a limited amount of water at all times. It will also be seen that there is a constant supply of water to the wheel through ports 29 in the partitions 17 forming the various reservoirs. In operation the wheel 25 sprays and distributes water upwardly into the in-rushing air so that the air will take up moisture therefrom, wet the filter and maintain the filter moist at all times, hence any air delivered to the interior of the vehicle will be moist and cooled. Opposite sides of the water collecting trough 27 are provided with upwardly and inwardly converging members 30 for converging sprayed water inwardly, into the air current. It will be noted that the wall 31 forming the front of reservoir, inclines upwardly and inwardly so the air will be directed into the air current, either being forced through the conditioner by the fan, or by the forward movement of the vehicle under its own power. Casing 6 is provided with a water filling opening 32, preferably located above the rear water reservoir and it will be seen that all of the reservoirs can be filled at the same time and also the collecting trough 27.

Conditioned air is conducted to the interior of the vehicle by an arcuate duct member 33 as shown in Figure 4, and it will be noted that this duct increases in transverse cross sectional area, gradually from passage 21. The duct member 33 curves downwardly and inwardly, and extends through the door opening, above the slidable glass window. The lower inner end of the duct member 33 is supported, in the window opening by means of a channel 34, extending transversely across the under side of the duct member, and in which channel the upper end of the glass window is received. The upper side of the duct member 33 is provided with a transversely disposed rib 35, which is received in the window glass channel, or groove 5 as shown in Figure 4. From the above it will be seen that the lower portion of the duct member is rigidly supported by the door of the vehicle at all times and moves therewith. The upper outer end of the duct member 33 is beveled inwardly and downwardly at 36, so that its upper end, when the vehicle door is closed will receive the lower end of the duct casing 20 as shown in Figure 4. By this construction it will be seen that the vehicle door may be opened, and closed without interference from the air conditioner and that when the vehicle door is closed, the duct connection between the air conditioner and the vehicle is made, without any other operation on the part of the operator than the closing of the door.

The motor wires 15 may lead to a battery 37 and a control switch 38 is disposed within the vehicle.

From the above, it will be seen that an air conditioner is provided for automobiles, wherein the conditioner is located outside the vehicle and in a position where its bulk is not noticeable and in a position other than in the window opening as is now the practice. It will also be seen that a conditioner is provided, of the outside type which delivers conditioned air to the vehicle, even when the vehicle is standing still.

The invention having been set forth, what is claimed as new and useful is:

1. An air conditioner for a vehicle comprising an elongated casing having a bottom side and an upper side, means for mounting the casing longitudinally on the side edge of the roof of a vehicle adjacent to and above a door opening in the side of the vehicle, said casing having an open front end, a screen closing off said end, said casing having a substantially centrally disposed air discharge opening in its upper side, an air filter enclosing said opening, a plurality of longitudinally spaced, transverse partitions provided in the lower side in contact with the inner surface thereof and upper edges lying below the center line of the casing between the upper and the bottom sides, said upper edges having horizontally disposed fore and aft extending flat flanges that lie in a common horizontal plane said partitions having communicating openings interconnecting the spaces between the partitions, said spaces being adapted to contain water and constituting water reservoirs said partitions and flanges preventing splashing of the water and retaining the water in the reservoirs, a baffle disposed on the inner surface of the bottom side and positioned behind the screen and extending upwardly and rearwardly toward the upper side of the casing to deflect incoming air toward the filter, a fan rotatably mounted between the screen and the baffle, supporting means for the fan mounted on the baffle, a water wheel carried by said supporting means, a water collecting trough provided in one of the spaces in fluid communication therewith and in which the water wheel is rotatably disposed, said trough having an open upper end lying below the supporting means, a casing duct member extending from the upper side of the casing in registry with the air discharge opening and encompassing the upper side and upper portion of the outer side of the casing, a duct, means for mounting one end of the duct in a window opening of a door so that it extends upwardly and outwardly therefrom, said duct having an outer free end having edge portion extensions on its walls that overlap and air tightly receive the outer end of the duct member.

2. An air conditioner as claimed in claim 1, wherein said casing has a closed rear end and a partition disposed adjacent the rear end and extending the entire width and height of the casing, said partition and rear end defining a motor housing, a motor mounted in the housing and connected to the supporting means for auxiliary rotation of the fan.

3. An air conditioner as claimed in claim 2, wherein said supporting means includes a shaft, one end of the shaft being journalled in the partition at the rear end of the casing and attached to the motor and the baffle having a bearing means on its upper end edge forming a support for the shaft.

4. An air conditioner as claimed in claim 1, wherein said duct member and duct have a continuous air passage which increases in area from the casing to the door opening.

References Cited in the file of this patent

UNITED STATES PATENTS

| | | |
|---|---|---|
| 2,189,391 | Bowdish | Feb. 6, 1940 |
| 2,364,249 | Steele | Dec. 5, 1944 |
| 2,435,798 | Rice et al. | Feb. 10, 1948 |
| 2,500,527 | Demuth | Mar. 14, 1950 |
| 2,516,103 | Brown | July 25, 1950 |
| 2,576,503 | Dean | Nov. 27, 1951 |
| 2,625,425 | Foster | Jan. 13, 1953 |
| 2,631,023 | Bailey | Mar. 10, 1953 |
| 2,700,927 | Jordan | Feb. 1, 1955 |